United States Patent
Hiraoka et al.

[11] Patent Number: 5,970,727
[45] Date of Patent: Oct. 26, 1999

[54] REFRIGERATING CYCLE APPARATUS

[75] Inventors: Hajime Hiraoka; Yoshihiro Tanabe; Hiroaki Makino; Hidenori Ishioka; Yasuo Imaki; Kazuaki Isono; Tadashi Saito, all of Tokyo, Japan

[73] Assignee: Mitsubishi Denki Kabushiki Kaisha, Tokyo, Japan

[21] Appl. No.: 09/137,122

[22] Filed: Aug. 20, 1998

[30] Foreign Application Priority Data

Aug. 25, 1997 [JP] Japan ..................................... 9-227869
May 12, 1998 [JP] Japan ................................... 10-128568

[51] Int. Cl.⁶ ...................................................... F24F 11/00
[52] U.S. Cl. ................................ 62/156; 62/193; 62/228.4
[58] Field of Search ............................. 62/151, 155, 156, 62/192, 193, 22.1, 228.4, 228.5

[56] References Cited

U.S. PATENT DOCUMENTS

| | | | |
|---|---|---|---|
| 4,724,680 | 2/1988 | Kawai | 62/228.4 X |
| 4,901,534 | 2/1990 | Nakatsuno et al. | 62/155 X |
| 5,323,619 | 6/1994 | Kim | 62/193 X |

*Primary Examiner*—Harry B. Tanner
*Attorney, Agent, or Firm*—Oblon, Spivak, McClelland, Maier & Neustadt, P.C.

[57] ABSTRACT

A refrigerating cycle apparatus including an inverter driven compressor with controllable speed of rotation, a four-way valve, an indoor heat exchanger, a pressure reducing device, outdoor heat exchanger, a defrosting condition detector for detecting a frosting state of the outdoor heat exchanger in a heating operation, a defrosting operation controller for carrying out a defrosting operation based on a detection signal from the defrosting condition detector and having a minimum operable frequency controller for controlling a minimum operable frequency for the compressor on restarting after completion of the defrosting operation and/or a starting speed controller for controlling a starting speed for the compressor based on a detection signal from the defrosting condition detector on restarting after completion of the defrosting operation in order to provide proper lubrication after a defrost operation.

14 Claims, 9 Drawing Sheets

REFRIGERATING CYCLE APPARATUS

BACKGROUND OF THE INVENTION

1. Field of the Invention

The present invention relates to control which improves the reliability of a compressor in a refrigerating cycle apparatus with a heating operation mode and defrosting operation mode.

2. Discussion of Background

Figure 11:
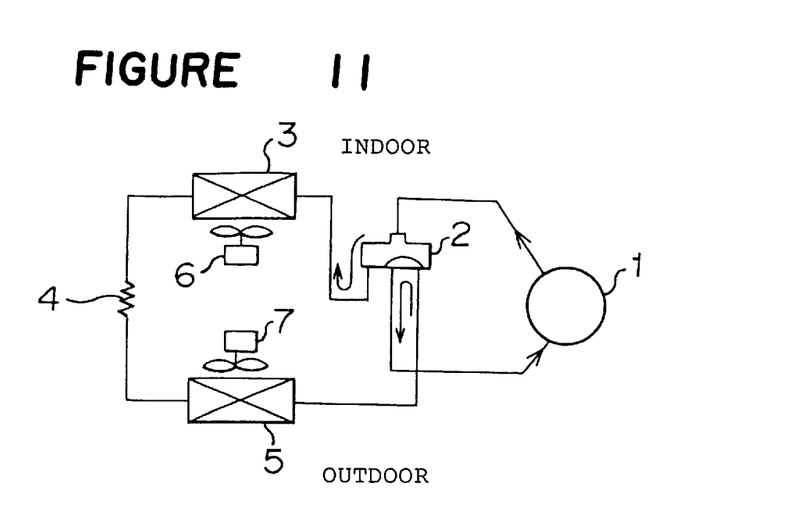
FIG. 11 is a refrigerant circuit diagram of a conventional refrigerating cycle apparatus.
Figure 12:
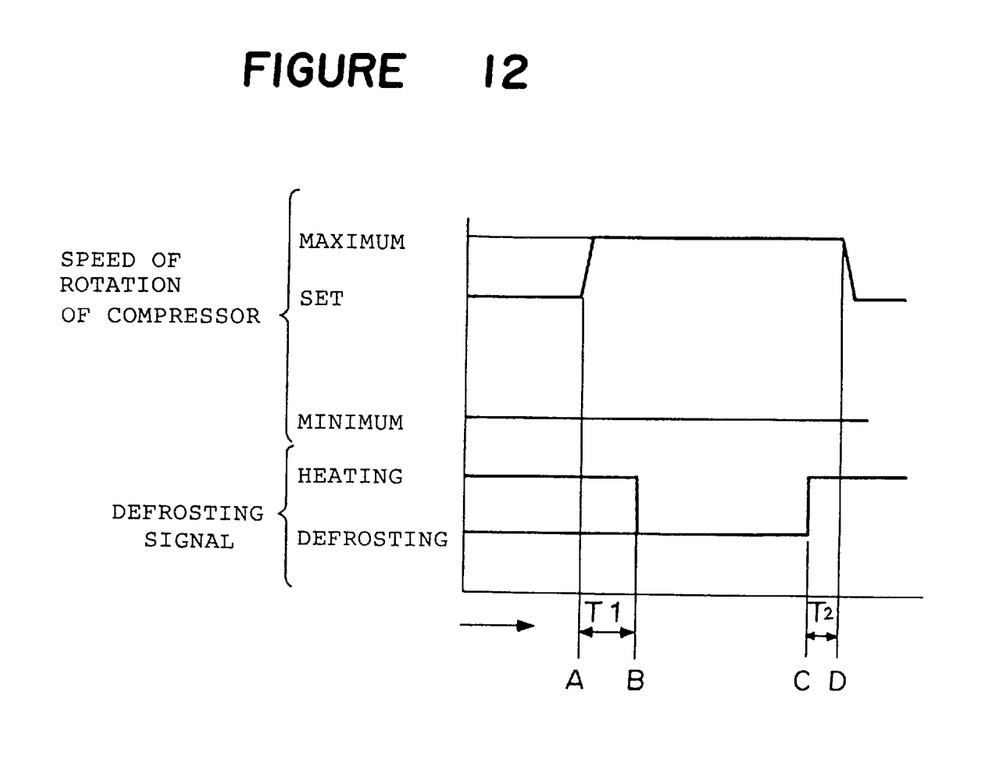
FIG. 12 is a timing chart with respect to the speed of rotation of the compressor and a defrosting signal in the conventional refrigerating cycle apparatus.

In FIGS. 11 and 12 are shown a refrigerant circuit diagram of a conventional refrigerating cycle apparatus shown in e.g. JP-A-58115235 and a timing chart of the speed of rotation and the defrosting signal for the compressor in the refrigerating cycle apparatus. In FIG. 11, reference numeral 1 designates a compressor driven by a compressor motor, reference numeral 2 designates a four-way valve as a directional control valve for reversing the flow of a refrigerant, reference numeral 3 designates an indoor heat exchanger, reference numeral 4 designates a pressure reducing device such as a capillary tube, and reference numeral 5 designates an outdoor heat exchanger. The four-way valve, the indoor heat exchanger, the pressure reducing device and the outdoor heat exchanger are connected to the compressor 1 as a closed circuit to constitute the refrigerating cycle apparatus. Reference numeral 6 designates an indoor fan provided to confront the indoor heat exchanger 3, and reference numeral 7 designates an outdoor fan provided to confront the outdoor heat exchanger.

When the compressor motor drives the compressor 1 at a cooling mode in the refrigerating cycle apparatus, the refrigerant which has been compressed by the compressor 1 is cooled to be condensed by air supply from the outdoor fan 7 at the outdoor heat exchanger 5, is depressurized by the pressure reducing device 4 and evaporates at the indoor heat exchanger 3 to perform a cooling function. The indoor fan 6 supplies cooled air to cool the inside of a room. On the other hand, at a heating mode, the four-way valve 2 is switched to an on position as shown in FIG. 11 to reverse the flow of refrigerant, flowing the refrigerant in the order of the compressor 1, the four-way valve 2, the indoor heat exchanger, the pressure reducing device 4 and the outdoor heat exchanger 5. The indoor fan 7 supplies heated air to carry out the heating operation.

It has been widely known that the compressor is controlled by adjusting the frequency or the voltage of the power source for the compressor motor with an inverter controller though not shown. In this case, a desired speed of rotation is found based on a room temperature, a set value of the room temperature, an outdoor air temperature and so on, an automatic control is carried out to accommodate variations in load. If frost is formed on the outdoor heat exchanger during the heating mode, a defrosting operation is carried out.

Now, the defrosting operation of the outdoor heat exchanger during the heating mode will be explained in reference to the timing chart of FIG. 12. The defrosting signal in FIG. 12 contains a signal which is outputted based on a signal from a defrosting timer which is built in a microcomputer and operates at a certain period of time, and a temperature data signal from a defrosting thermostat and the like for detecting the temperature of the outdoor heat exchanger. For example, provided that the defrosting timer operates so as to carry out the heating operation for 50 minutes and the defrosting operation for 10 minutes in a period of 60 minutes, and that the defrosting thermostat outputs a signal indicative of defrosting completion at a temperature not less than 10° C. and a signal indicative of frosting at a temperature not higher than −2.5° C., the defrosting signal is outputted so as to commence defrosting at an AND condition of the defrosting timer and the defrosting thermostat and to complete defrosting at an OR condition of the defrosting timer and the defrosting thermostat.

In other words, when the defrosting thermostat detects a temperature higher than 10° C. or 10 minutes for the defrosting operation has passed, the defrosting operation is completed and the apparatus returns to the heating operation. For example, when the defrosting timer reaches an A point, the microcomputer and the inverter controller are activated to increase the speed of rotation the compressor motor to the maximum value, keeping the heating operation. At a B point after lapse of a T1 period of time since the A point, a defrosting signal indicative of switching the four-way valve to an off position (cooling position) is outputted to switch the four-way valve, commencing the defrosting operation. During the defrosting operation, the compressor motor is rotated at the maximum value.

When the signal indicative of defrosting completion is outputted at a C point for completion of the defrosting operation, the microcomputer is activated to output a signal indicative of switching the four-way valve from the cooling position to the heating position, switching the four-way valve. However, the compressor motor is driven at the maximum speed of rotation for a T2 period of time after that, and returns to a normal set speed of revolution, continuing the heating operation.

As clearly seen from the explanation above, the prior art has increased the speed of rotation of the compressor to a value greater than the set speed of rotation calculated based on a room temperature and a set room temperature during the defrosting operation and certain periods of time before and after the defrosting operation.

Since the conventional refrigerating cycle apparatus has been constructed as stated earlier, an increase in the speed of rotation of the compressor from a normal set speed of rotation during the defrosting operation and after the defrosting operation causes a lubricating oil in the compressor to be taken out of the compressor housing at a large amount after defrosting. If the room temperature is near to a set temperature, the compressor is rotated at a low speed operation. If the compressor carries out such a low speed operation in a low outdoor air temperature state requiring the defrosting operation, the lubricating oil which has been taken out of the compressor housing becomes difficult to be recovered into the compressor due to a decrease in the current speed of the refrigerant, creating a problem in that the amount of the lubricating oil in the compressor housing reduces to degrade the reliability of the compressor.

Although it has been recently known that an HFC refrigerant (R410A, R407C, R32 etc.) and a lubricating oil of alkylbenzene are used in the refrigerating cycle apparatus, the lubricating oil which has been taken out becomes more difficult to be recovered into the compressor than the prior art apparatus since the mutual compatibility between the refrigerant and the lubricating oil in this case is lower than a combination of a conventional HCFC refrigerant (R22) and a lubricating oil of mineral oil or alkylbenzene.

SUMMARY OF THE INVENTION

It is an object of the present invention to solve these problems, and to improve the reliability of a compressor in operation at a low outdoor air temperature.

It is another object of the present invention to ensure returning a lubricating oil to the compressor even in a combination of an HFC refrigerant (R410A, R407C, R32 etc.) and an alkylbenzene lubricating oil, improving the reliability of the compressor.

The present invention provides a refrigerating cycle apparatus which is constituted by connecting an inverter driven compressor with controllable speed of rotation, a four-way valve, an indoor heat exchanger, a pressure reducing device and an outdoor heat exchanger by refrigerant pipes, and wherein the apparatus comprises a defrosting condition detector for detecting a frosting state of the outdoor heat exchanger during a heating operation, a defrosting operation controller for carrying out a defrosting operation based on a detection signal from the defrosting condition detector, and a minimum operable frequency controller for controlling a minimum operable frequency for the compressor on completion of the defrosting operation.

The apparatus may comprise a compressor temperature detector for detecting a temperature of the compressor, and the minimum operable frequency controller for controlling the minimum operable frequency based on a detection signal from the defrosting condition detector and a detection signal from the compressor temperature detector.

The outdoor heat exchanger may be provided with a refrigerant temperature sensor, and there may be provided the minimum operable frequency controller for controlling the minimum operable frequency based on a detection signal from the outdoor refrigerant temperature sensor and an operational frequency of the compressor.

There may be provided an outdoor air temperature sensor for detecting an outdoor air temperature, and there may be provided the minimum operable frequency controller for controlling the minimum operable frequency based on a detection signal from the outdoor air temperature sensor.

The present invention also provides a refrigerating cycle apparatus which is constituted by connecting an inverter driven compressor with controllable speed of rotation, a four-way valve, an indoor heat exchanger, a pressure reducing device and an outdoor heat exchanger by refrigerant types, and wherein the apparatus comprises a defrosting condition detector for detecting a frosting state of the outdoor heat exchanger during a heating operation, a defrosting operation controller for carrying out a defrosting operation based on a detection signal from the defrosting condition detector, and a starting speed controller for controlling a starting speed for the compressor on completion of the defrosting operation based on a detection signal from the defrosting condition detector.

The apparatus may comprise a compressor temperature detector for detecting a temperature of the compressor, and the starting speed controller for controlling the starting speed based on a detection signal from the defrosting condition detector and a detection signal from the compressor temperature detector on completion of the defrosting operation.

There may be provided an outdoor air temperature sensor for detecting an outdoor air temperature, and there may be provided the minimum operable frequency controller for controlling the minimum operable frequency based on a detection signal from the outdoor air temperature sensor.

The refrigerating cycle apparatus may be constructed so that a lubricating oil is retained in a housing of the compressor and lubricates sliding parts of the compressor, that when the oil is flowed out into a refrigerating cycle from the compressor, the oil circulates in the refrigerating cycle along with a refrigerant, and that the oil is hardly compatible with the refrigerant and the oil has such a fluidity and a viscosity that the oil can return to the compressor.

The refrigerant may be an HFC refrigerant and the lubricating oil may be an alkylbenzene lubricating oil.

The refrigerant may be an R410A refrigerant and the lubricating oil may be an alkylbenzene lubrication oil.

The refrigerant may be an R407C refrigerant and the lubricating oil may be an alkylbenzene lubricating oil.

The refrigerant may be an R32 refrigerant and the lubricating oil may be an alkylbenzene lubricating oil.

As explained, the refrigerating cycle apparatus according to the present invention which is constituted by connecting the inverter driven compressor with controllable speed of rotation, the four-way valve, the indoor heat exchanger, the pressure reducing device and the outdoor heat exchanger by the refrigerant pipes is provided with the defrosting condition detector for detecting the frosting state of the outdoor heat exchanger during the heating operation, the defrosting operation controller for carrying out the defrosting operation based on a detection signal from the defrosting condition detector, and the minimum operable frequency controller for controlling the minimum operable frequency of the compressor on completion of the defrosting operation. As a result, the operable frequency of the compressor after completion of the defrosting operation can be altered to make the lubricating oil taken out of the compressor recovered into the compressor easily, offering an advantage in that the reliability of the compressor is improved.

When the apparatus comprises the compressor temperature detector for detecting a temperature of the compressor and the minimum operable frequency controller for controlling the minimum operable frequency based on a detection signal from the defrosting condition detector and a detection signal from the compressor temperature detector, there is offered an advantage in that the operable frequency of the compressor after completion of the defrosting operation can be adequately altered.

When the outdoor heat exchanger is provided with the refrigerant temperature sensor and there is provided the minimum operable frequency controller for controlling the minimum operable frequency based on a detection signal from the refrigerant temperature sensor and the operational frequency of the compressor, there is offered an advantage in that the operable frequency of the compressor after completion of the defrosting operation can be adequately uttered.

When there is provided the outdoor air temperature sensor for detecting an outdoor air temperature and there is provided the minimum operable frequency controller for controlling the minimum operable frequency based on a detection signal from the outdoor air temperature sensor, there is offered an advantage in that the detection precision of an outdoor air temperature can be improved to carry out a protection control for the compressor with good precision.

The refrigerating cycle apparatus according to the second mode of the present invention which is constituted by connecting the inverter driven compressor with controllable speed of rotation, the four-way valve, the indoor heat exchanger, the pressure reducing device and the outdoor heat exchanger by the refrigerant pipes, is provided with the defrosting condition detector for detecting the frosting state of the outdoor heat exchanger during the heating operation, the defrosting operation controller for carrying out the defrosting operation based on a detection signal from the defrosting condition detector, and the starting speed controller for controlling the starting speed for the compressor on completion of the defrosting operation based on a detection signal from the defrosting condition detector. As a result, the lubricating oil is hardly taken out of the compressor during the heating operation after the defrosting operation, offering an advantage in that the reliability of the compressor is improved.

When there is provided the compressor temperature sensor for detecting a temperature of the compressor and there is provided the starting speed controller for controlling the starting speed for the compressor on completion of the defrosting operation based on a detection signal from the defrosting condition detector and a detection signal from the compressor temperature detector in the second mode of the present invention, there is offered an advantage in that the starting speed of the compressor after completion of the defrosting operation can be adequately altered.

When there is provided the outdoor air temperature sensor and there is provided the starting speed controller for controlling the starting speed based on a detection signal from the outdoor air temperature sensor in the second mode of the present invention, the detection precision of an outdoor air temperature can be improved to carry out a protective control for the compressor with good precision.

When the apparatus is constructed so that a lubricating oil is retained in the housing of the compressor and lubricates sliding parts of the compressor, that when the oil is flowed out into the refrigerating cycle from the compressor, the oil circulates in the refrigerating cycle along with a refrigerant, and that the oil is hardly compatible with the refrigerant and the oil has such a fluidity and a viscosity that the oil can return to compressor, the lubricating oil hardly mixes into the refrigerant. With respect to a material which causes a phenomenon wherein the lubricating oil is taken out of the compressor housing, the operable frequency of the compressor after completion of the defrosting operation can be altered to make the lubricating oil taken out of the compressor recovered into the compressor easily, offering an advantage in that the reliability of the compressor is improved.

When the refrigerant is an HFC refrigerant such as an R410A, an R407C refrigerant and an R32 refrigerant and the lubricating oil is an alkylbenzene lubricating oil, the similar effect can be obtained, taking the environment problem into account.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Now, embodiments of the present invention will be described in reference to the accompanying drawings.

EMBODIMENT 1

Figure 1:
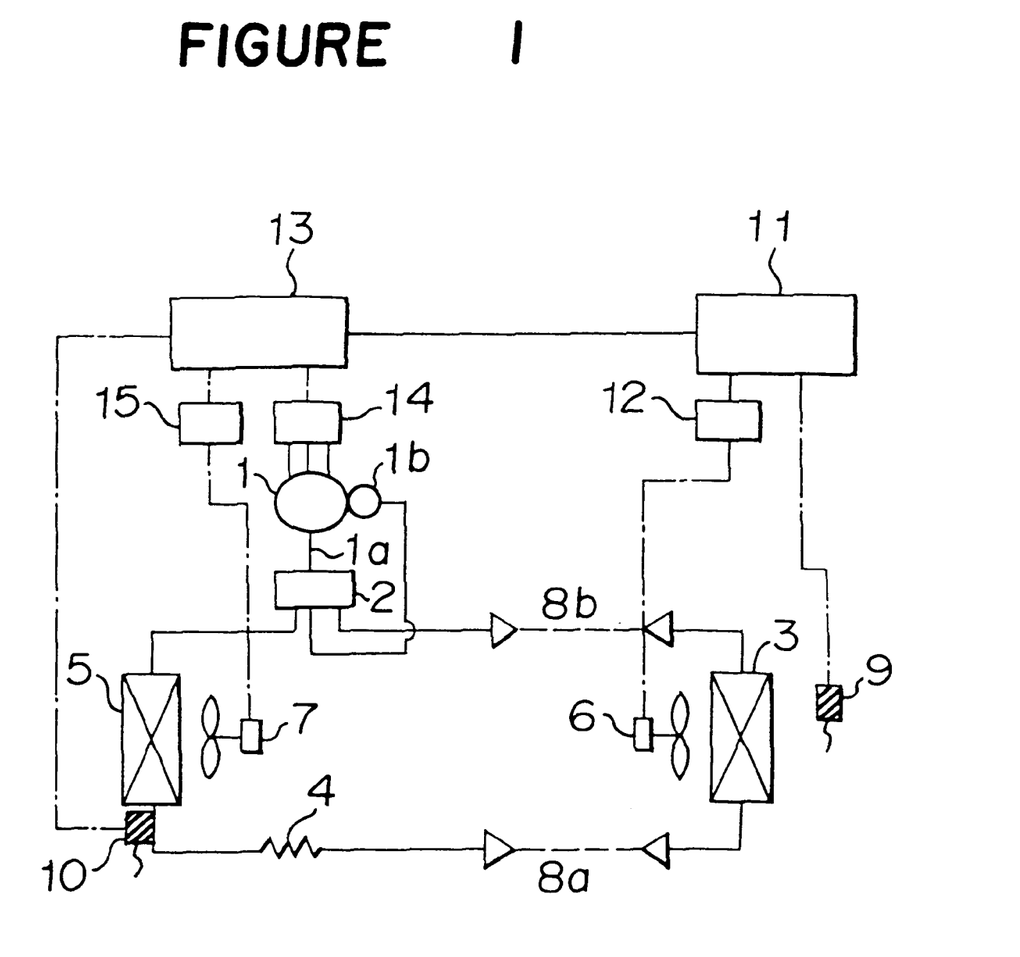
FIG. 1 is a schematic view showing the refrigerating cycle apparatus according to a first and a fifth embodiment of the present invention.

In FIG. 1 is shown a schematic diagram of the refrigerant circuit and the control circuit of an air conditioner with the refrigerating cycle apparatus according to a first embodiment. In FIG. 1, reference numeral 1 designates a motor-operated compressor, reference numeral 2 designates a four-way valve as a directional control valve for a refrigerant circuit, reference numeral 3 designates an indoor heat exchanger, reference numeral 4 designates a pressure reducing device, and reference numeral 5 designates an outdoor heat exchanger. These elements are property connected to form the refrigerating cycle apparatus. Reference numerals 6 and 7 designate an indoor fan and an outdoor fan which are provided for the indoor heat exchanger 3 and the outdoor heat exchanger 5, respectively.

Reference numeral 9 designates a thermistor for detecting a room temperature, reference numeral 11 designates an indoor microcomputer and reference numeral 13 an outdoor microcomputer. These members control an inverter device (not shown) which in turns controls the frequency and the voltage of the power source to the motor operated compressor 1. Specifically, based on a room temperature detected by the thermistor 9 and a set room temperature, the indoor microcomputer 11 calculates a desired operational frequency for the outdoor compressor depending on a load in a room, and forwards required information to the outdoor microcomputer 13. The outdoor microcomputer 13 automatically controls the speed of rotation of the compressor based on the information from the indoor microcomputer 11.

The outdoor microcomputer 13 includes means for carrying out such a control to change the minimum operable frequency of the compressor to a certain frequency higher than a normal minimum frequency and to set the minimum operable frequency to the higher frequency after completion of a defrosting operation, and means for carrying out such a control to change the starting speed of the compressor to a certain speed and set the starting speed to the certain speed after completion of a defrosting operation.

Reference numeral 10 designates a frost detecting thermistor, which detects the temperature of the refrigerant pipe on the outlet side of the outdoor heat exchanger 5. The signal detected by the frost detecting thermistor is forwarded to the outdoor microcomputer 13 to determine based on the temperature information whether defrosting conditions are met or frost is supposed to be formed. In other words, the frost detecting thermistor 10 and the outdoor microcomputer 13 form a defrosting condition detector.

When the indoor microcomputer 11 is informed by the outdoor microcomputer 13 that the defrosting conditions are met, the indoor microcomputer carries out such a control to switch to a defrosting operation mode wherein the indoor fan for the indoor unit is stopped. In addition, the outdoor microcomputer 13 also carries out such a control to switch to a defrosting operation mode wherein the four-way valve is reversed. In other words, the indoor microcomputer 11 and the outdoor microcomputer 13 form a defrosting operation controller.

Figure 2:
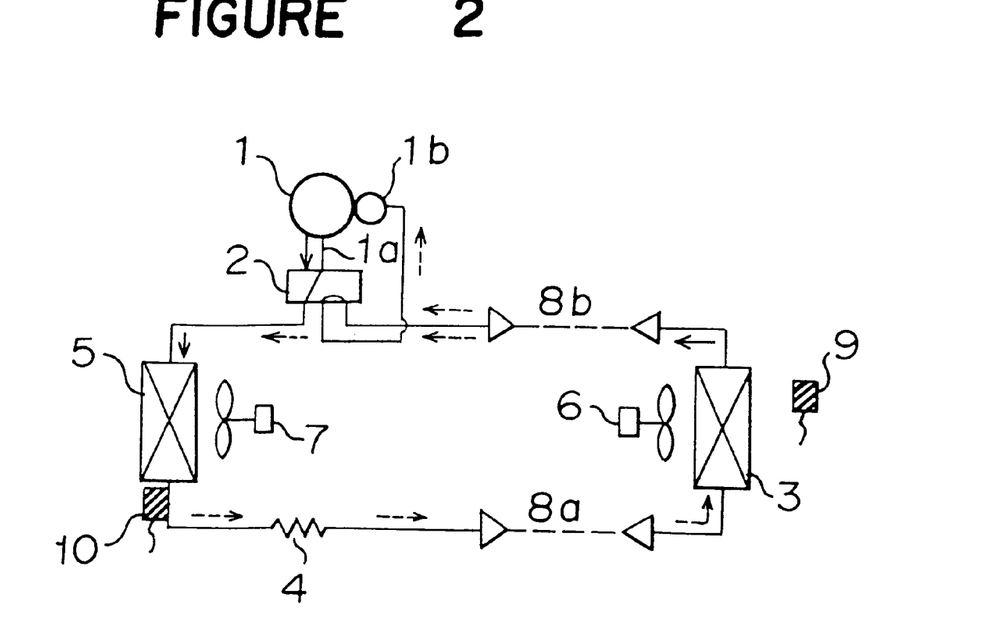
FIG. 2 is a schematic diagram showing the refrigerant flow in a cooling operation of the refrigerating cycle apparatus according to the first and the fifth embodiment of the present invention.
Figure 3:
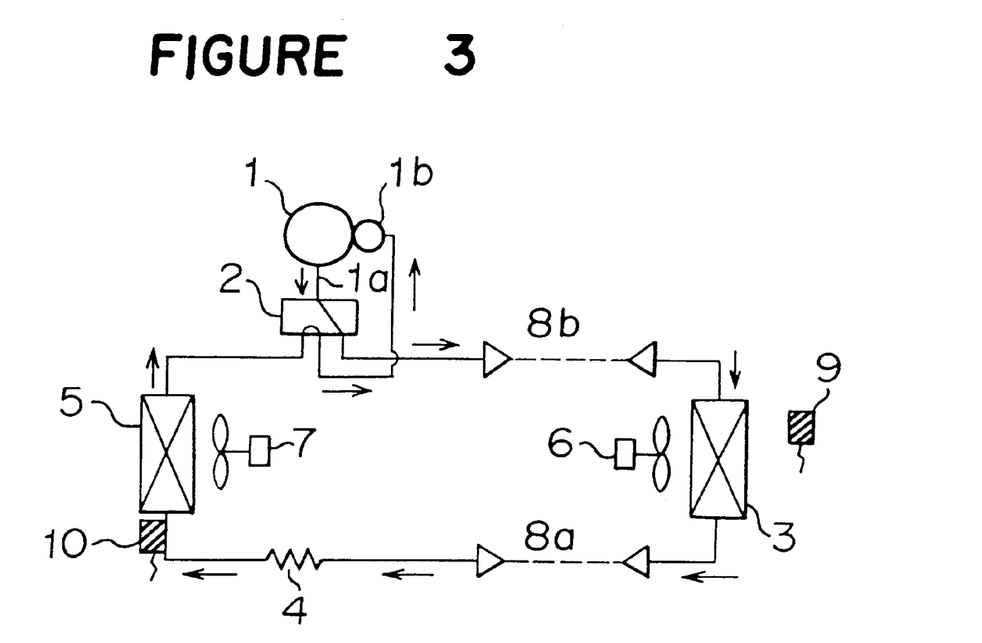
FIG. 3 is a schematic diagram showing the refrigerant flow in a heating operation of the refrigerating cycle apparatus according to the first and the fifth embodiment of the present invention.

Now, the operation will be explained. In FIG. 2 is shown a schematic diagram of the refrigerant flow in a cooling operation, and in FIG. 3 is shown a schematic diagram of the refrigerant flow in a heating operation. Since the heating operation and the cooling operation of the refrigerating cycle apparatus according to the present invention are the same as the conventional apparatus, explanation of the heating operation and the cooling operation will be omitted.

When a low outdoor air temperature causes the outdoor heat exchanger 5 to be cooled to a temperature below the ice point so as to form frost on the outdoor heat exchanger during the heating operation, the efficiency of the heat exchanger is extremely lowered. In this case, based on a temperature detected from the frost detecting thermistor 10, the outdoor microcomputer 13 determined whether the defrosting conditions are met or not. If affirmative, the defrosting operation starts to thaw the frost deposited on the outdoor heat exchanger 5.

In general, defrosting is carried out by switching the four-way valve 2 shown in FIG. 1 from a heating position to a cooling position as explained with respect to the prior art. By this switching, a gaseous refrigerant which is discharged from the compressor and has a high pressure and a high quantity of heat is forwarded to the outdoor heat exchanger 5 removes the frost on the outdoor heat exchanger 5 by the heat of the refrigerant. When defrosting is completed, the temperature of the pipe on the outlet side of the outdoor heat exchanger 5 is raised to a temperature not less than the ice point. The frost detecting thermistor 10 detects it, and the outdoor microcomputer 13 determines based on the detection that the defrosting operation completion conditions are met, and carries out such a control to complete the defrosting operation.

During the defrosting operation, the indoor fan 6 is normally stopped to prevent the room temperature from lowering. As a result, the refrigerant which has released heat in the outdoor heat exchanger 5 to be liquefied returns to the compressor 1 without evaporating in the indoor heat exchanger 3. Although a part of the liquefied refrigerant is stored in an accumulator 1b provided on the intake side of the compressor 1, a two-phase refrigerant of liquid and gas is normally inspired into the compressor 1. The compressor 1 is cooled by the liquefied refrigerant to have the temperature therein lowered.

In addition, a lubricating oil in the compressor 1 is also cooled to have the refrigerant mixed thereinto, raising the oil level in the compressor 1. When the defrosting operation is completed and a normal heating operation restarts in such a state, a high speed of rotation of the compressor causes the lubricating oil in the compressor 1 to be taken out of the compressor housing at a large amount. If the lubricating oil which has been taken out of the compressor housing is recovered into the compressor along with refrigerant during the normal heating operation, the shortage of the lubricating oil hardly affects the reliability of the compressor since an operation with shortage of the lubricating oil is not so long. However, if the oil is not recovered in a short period of time, the reliability of the compressor is extremely deteriorated.

The time required for recovery of the lubricating oil depends on the current speed of the refrigerant. The drop in a room temperature caused by a defrosting operation is normally as small as 1–2° C. When the defrosting operation ends and a heating operation restarts, the heating load in the room is small because of such a small difference between an actual room temperature and a set temperature. The small heating load causes the indoor microcomputer 11 to command the outdoor microcomputer 13 to shift the operational frequency of the compressor 1 to a low speed range promptly after completion of high speed restarting. The heating operation is carried out in such a state that the lubricating oil which has been taken out of the compressor 1 on restarting is difficult to be recovered into the compressor.

Figure 4:
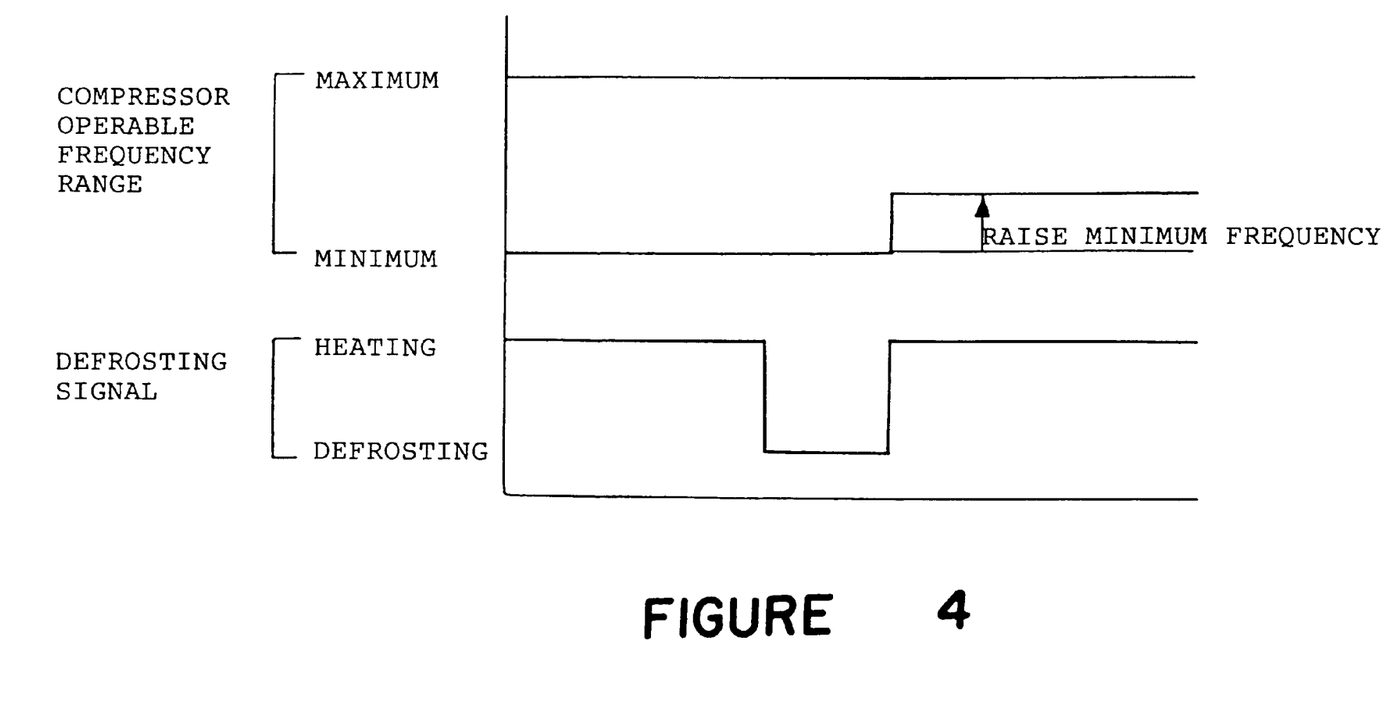
FIG. 4 is a timing chart of the refrigerating cycle apparatus in a defrosting operation according to the first and the fifth embodiment of the present invention.

In accordance with the present invention, when the defrosting operation ends and the heating operation restarts, the outdoor microcomputer 13 changes the minimum operational frequency of the compressor to a certain frequency higher than the minimum frequency in a normal operation as shown in the timing chart of FIG. 4 in order that lubricating oil which has been taken out of the compressor 1 can be recovered into the compressor 1 promptly. Or the outdoor microcomputer changes the minimum operational frequency of the compressor to e.g. a higher frequency than the minimum frequency of the compressor before the defrosting operation.

Figure 6:
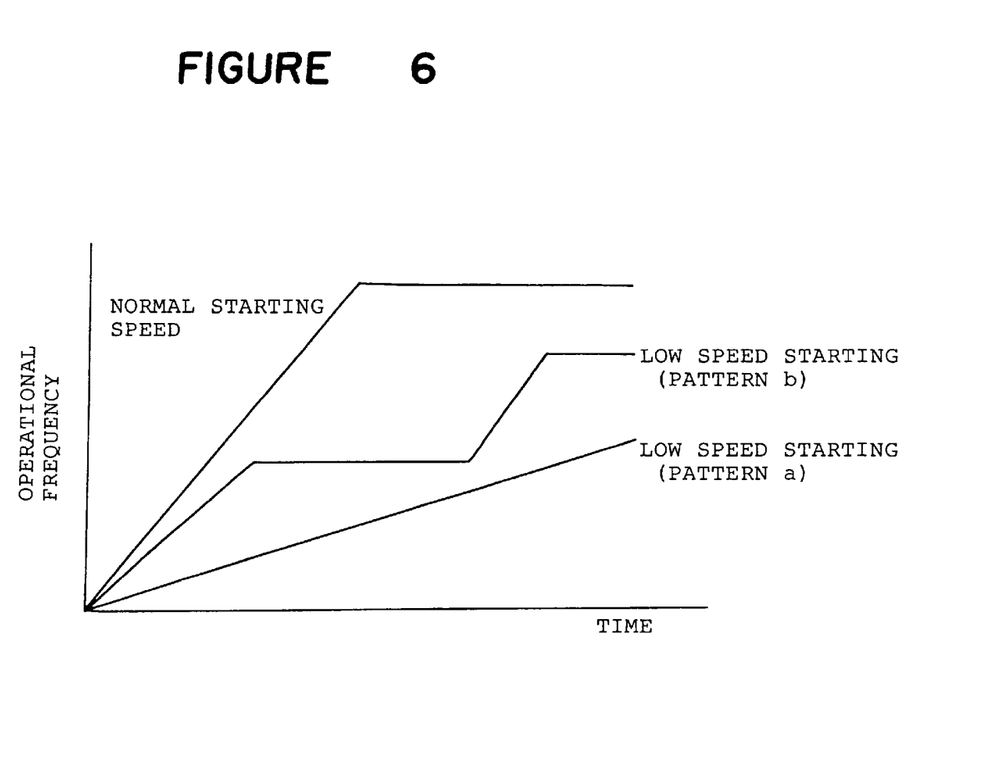
FIG. 6 is a graph showing the correlation of starting speeds of the refrigerating cycle apparatus on a heating operation after a defrosting operation according to the first and the fifth embodiment of the present invention.

In addition, the outdoor microcomputer 13 changes the starting speed of the compressor 1 to a low speed starting pattern a or b lower than a normal starting speed for the heating operation as shown in the graph of FIG. 6 in order to reduce the quantity of the lubricating oil which is taken out of the compressor 1 on restarting the compressor.

Figure 5:
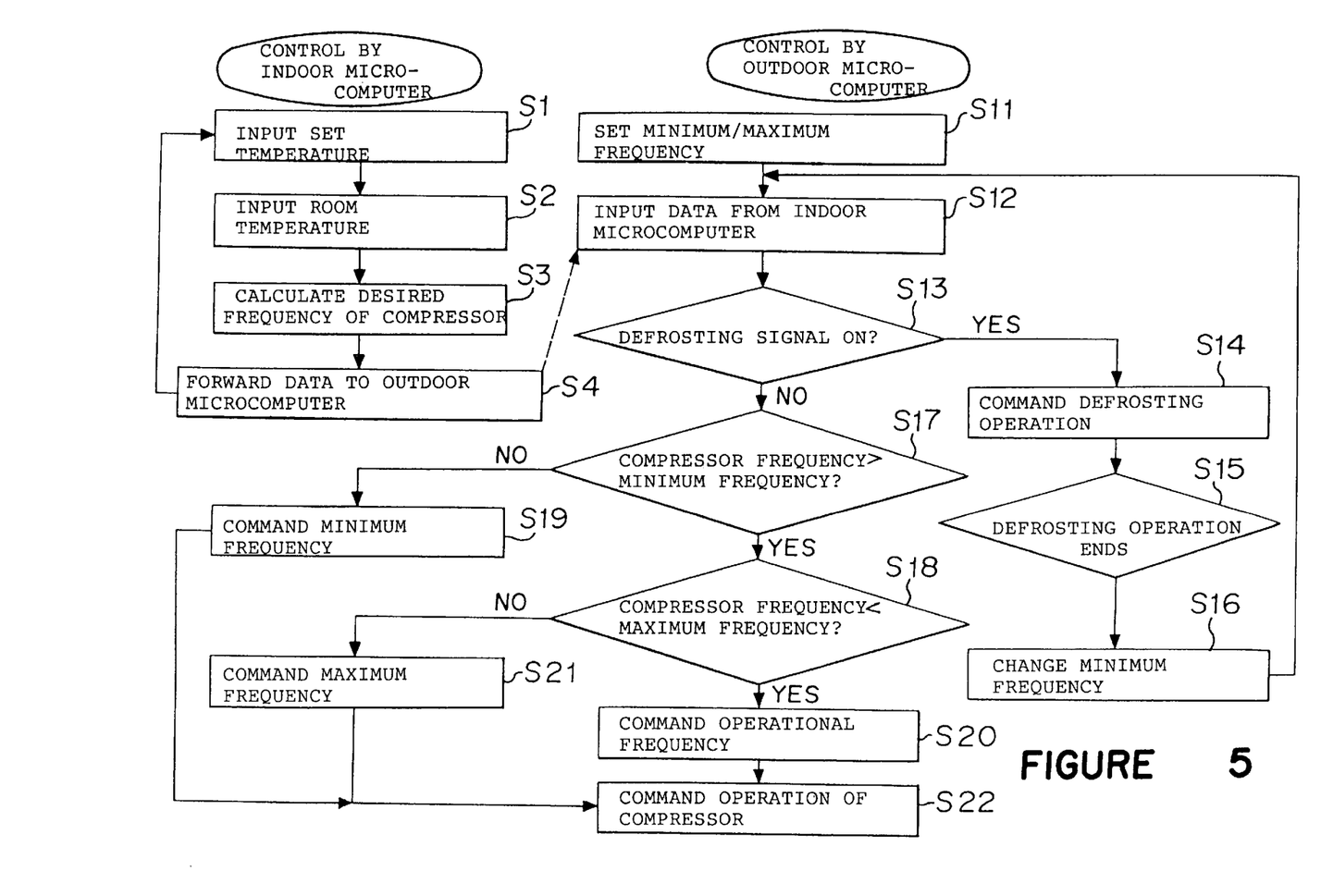
FIG. 5 is a control flow chart of an indoor microcomputer and an outdoor microcomputer of the refrigerating cycle apparatus according to the first and the fifth embodiment of the present invention.

These control processes are shown in the flow chart of FIG. 5. The process which corresponds to FIG. 4 is carried out at S16, and the process which corresponds to FIG. 6 is carried out at S22.

Although explanation of the change in the minimum frequency of the compressor to a higher level and the reduction in the starting speed of the compressor during the heating operation after completion of the defrosting operation has been made, the outdoor air temperature may be regarded as not being at a certain low outdoor air temperature if the time wherein the defrosting operation has been carried out is not shorter than a certain period of time. In this case, the raise in the minimum frequency and the low speed starting of the compressor may not be carried out after the defrosting operation. Or the change in the minimum frequency and the low speed starting may be released, and the minimum operational frequency may be reset at a lower level than the raised minimum operational frequency.

In FIG. 1, reference numeral 1a a discharging pipe, reference numeral 8a designates a connecting pipe between indoor and outdoor (a liquid side), reference numeral 8b designates a connecting pipe between and indoor and outdoor (a gaseous side), reference numeral 12 designates a device for driving the indoor fan, reference numeral 14 designates a device for driving the compressor, and reference numeral 15 designates a device for driving the outdoor fan. These members are incorporated into the apparatus as in the conventional apparatus.

EMBODIMENT 2

Figure 7:
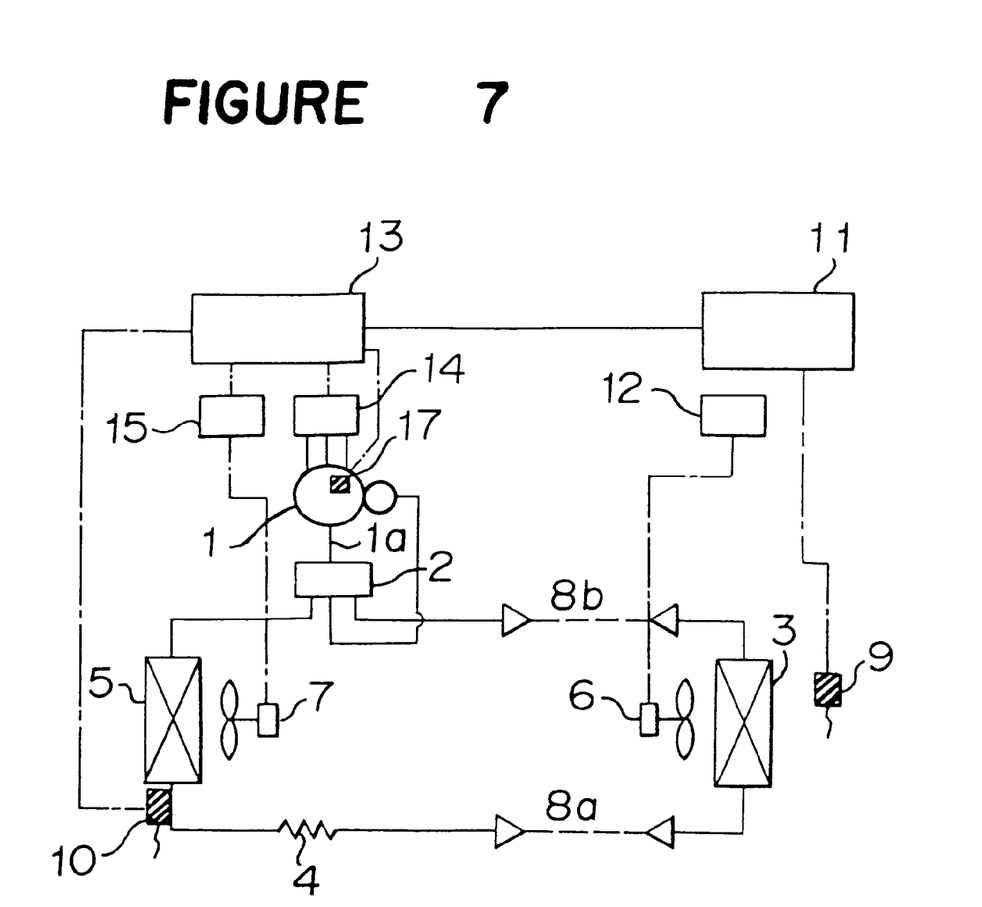
FIG. 7 is a schematic diagram of the refrigerating cycle apparatus according to a second and a sixth embodiment of the present invention.

In FIG. 7 is shown a schematic diagram of the refrigerant circuit and the control circuit in the air conditioner with the refrigerating cycle apparatus according to a second embodiment incorporated therein. In FIG. 7, parts similar or corresponding to those in FIG. 1 are indicated by the same reference numerals, and explanation of these parts will be omitted. In FIG. 7, reference numeral 17 designates a compressor temperature thermistor as a detector for detecting the temperature of the compressor 1. The outdoor microcomputer 13 includes means for carrying out such a control to alter a set value for the minimum frequency of the compressor 1 and means for carrying out such a control to alter the starting speed of the compressor 1, both of which make the alteration based on a detection signal from the defrosting condition detector and a temperature signal of the compressor 1 from the compressor temperature thermistor 17 prior to restart of the compressor.

The operation will be explained. When a low outdoor air temperature causes the outdoor heat exchanger to be cooled to a temperature below the ice point so as to form frost on the outdoor heat exchanger during the heating operation, the efficiency of the heat exchanger is extremely lowered. In this case, the defrosting operation starts to thaw the frost deposited on the outdoor heat exchanger 5 in the defrosting operation. The defrosting operation causes the compressor to be cooled by a liquid refrigerant so as to lower the temperature in the compressor as explained with respect to Embodiment 1.

The quantity of the frost widely varies depending on not only an outdoor air temperature but also an outdoor air humidity. For this reason, the time required for the defrosting operation is affected by the outdoor air temperature and the outdoor air humidity.

When the quantity of the frost is small, or when the humidity is low, the drop in the compressor temperature in the defrosting operation is minute since the time required for the defrosting operation is short. In other words, the quantity of the lubricating oil which is taken out of the compressor housing on restarting after completion of the defrosting operation is small. In this case, the raise in the minimum operable frequency of the compressor or the low speed starting of the compressor on restarting may not be carried out.

In this embodiment, a detection signal from the compressor temperature thermistor 17 is also utilized in addition to a detection signal from the defrosting condition detector. When it is detected that the compressor temperature has lowered, the minimum operable frequency for the compressor is raised and the starting speed of the compressor 1 is lowered after completion of the defrosting operation. When it is not detected that the compressor temperature has lowered, the outdoor microcomputer 13 carries out such a control that a set minimum operable frequency or the starting speed of the compressor is not altered.

As explained, based on signals from the defrosting condition detector and the compressor temperature detector, the outdoor microcomputer 13 alters the set minimum frequency and the starting speed when a large amount of the lubricating oil has been taken out of the compressor housing. This embodiment can reduce the deterioration in comfort which would be otherwise caused by variations in room temperature adjustment due to a raise in the minimum frequency or a prolonged room temperature adjustment period of time due to a drop in the starting speed.

EMBODIMENT 3

In the first embodiment, the outdoor air temperature is detected by the frost detecting thermistor 10, and the set minimum frequency for the compressor 1 is altered after the defrosting operation if it is determined that the outdoor air temperature is at the certain low temperature. The frost detecting thermistor 10 shown in FIG. 1 may be utilized as a refrigerant temperature detecting sensor for the outdoor heat exchanger 5 to detect the evaporation temperature of the refrigerant, and the outdoor microcomputer 13 may find the current speed of the refrigerant or the outdoor air temperature state based on the operational frequency of the compressor 1 to control the minimum frequency.

Figure 8:
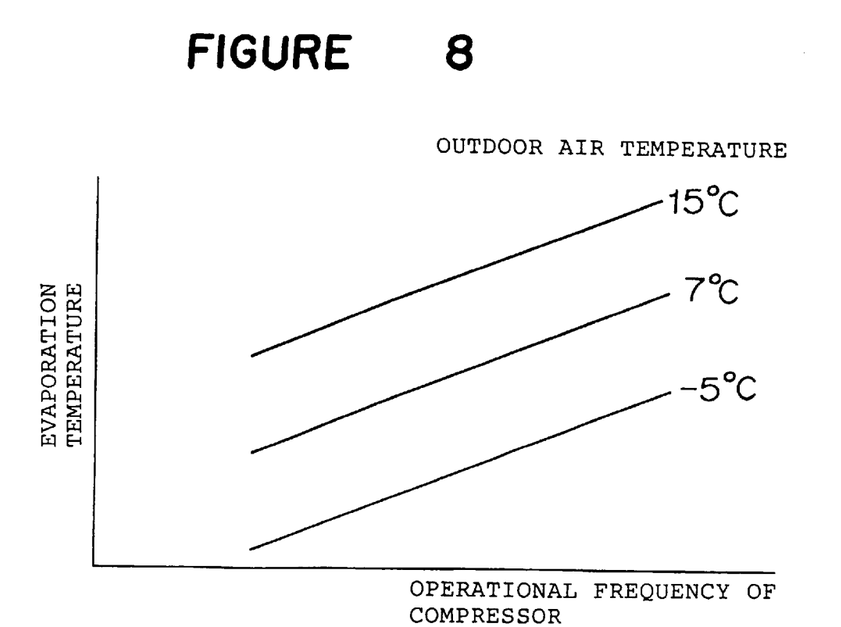
FIG. 8 is a graph showing the correlation of outdoor air temperatures at the refrigerant cycle apparatus according to a third and a seventh embodiment of the present invention.

Since the outdoor heat exchanger 5 as an evaporator in the heating operation absorb heat in the outdoor air, the evaporation temperature lowers as the outdoor air temperature is colder, which is shown in FIG. 8. According to FIG. 8, the outdoor air temperature is estimated based on an evaporation temperature and an operational frequency of the compressor. The outdoor microcomputer 13 can estimate the outdoor air temperature state based on the temperature detected by the frost detecting thermistor 10. If the outdoor microcomputer determines that the outdoor air temperature is at the certain low temperature, the outdoor microcomputer raises the minimum frequency to an operational frequency at which the lubricating oil can be recovered into the compressor 1.

Figure 9:
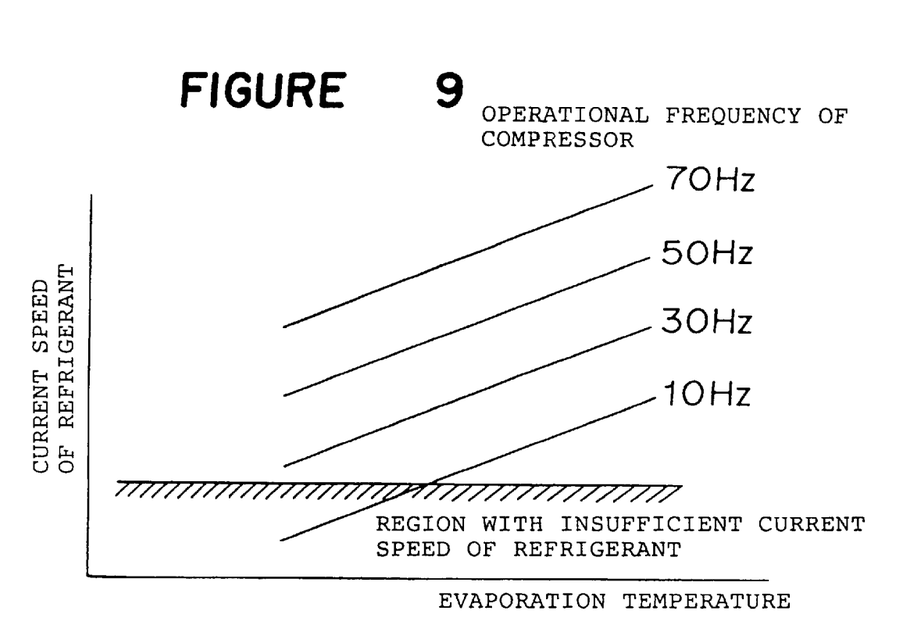
FIG. 9 is a graph showing the correlation of refrigerant current speeds of the refrigeration cycle apparatus according to the third and the seventh embodiment of the present invention.

Or, the outdoor microcomputer 13 may find the current speed of the refrigerant based on the temperature of the evaporated refrigerant in the outdoor heat exchanger 5 and the operation frequency of the compressor 1 as shown in FIG. 9. When the outdoor microcomputer determines that the outdoor air temperature is at the certain low temperature and the current speed of the refrigerant lowers so as to make recovery of the lubricating oil into the compressor impossible, the minimum operational frequency of the compressor 1 may be raised to a frequency value at which the lubricating oil can be recovered into the compressor.

Although the evaporation temperature is detected by the frost detecting thermistor 10 in this embodiment, the outdoor heat exchanger 5 may have a substantially intermediate portion thereof formed with a thermistor.

EMBODIMENT 4

Figure 10:
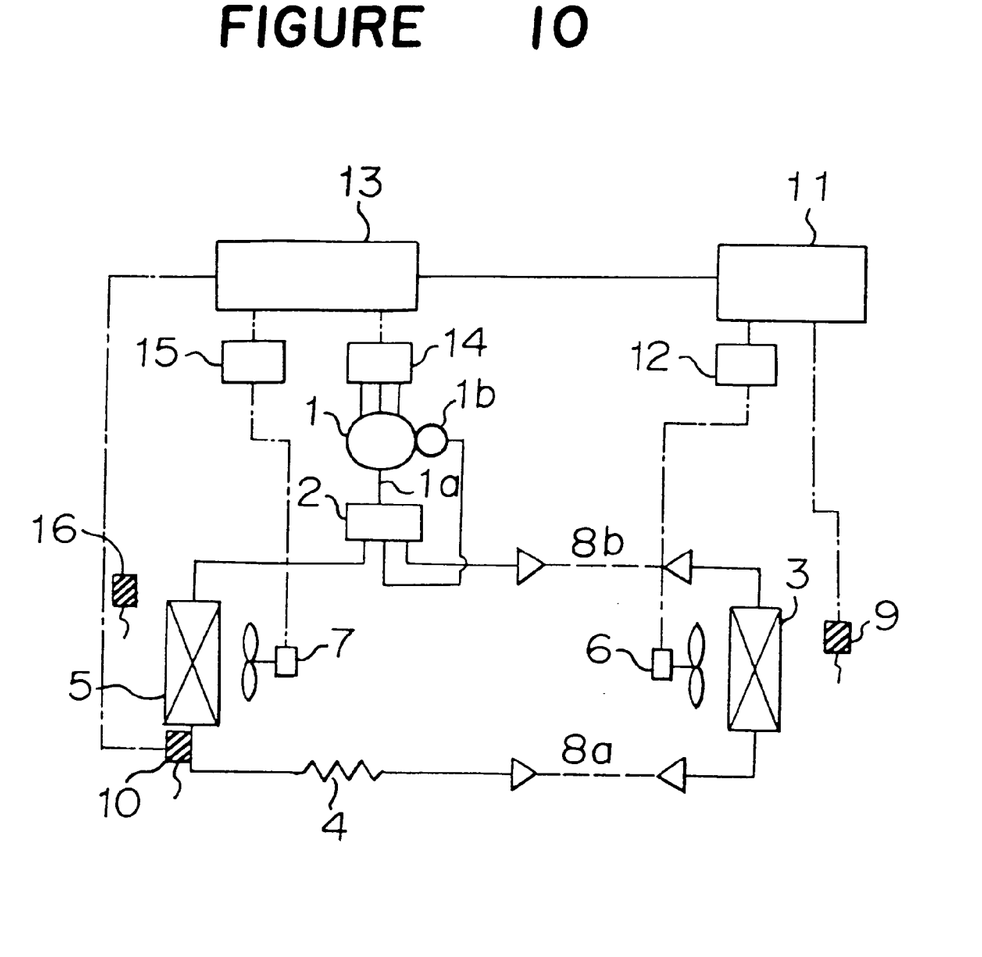
FIG. 10 is a schematic diagram of the refrigerating cycle apparatus according to a fourth and an eighth embodiment of the present invention.

Although the outdoor air temperature is found based on the evaporation temperature of the refrigerant in the outdoor heat exchanger 5 and the operational frequency of the compressor 1 in the third embodiment, the outdoor heat exchanger may have an outdoor air temperature sensor 16 provided thereon as shown in FIG. 10 to directly detect an outdoor air temperature.

In this case, when the outdoor microcomputer 13 determines based on a detection signal from the outdoor air temperature sensor 16 that the outdoor air temperature is at the certain low value, the minimum operational frequency of the compressor 1 is raised or the starting speed of the compressor 1 is lowered.

EMBODIMENT 5

Now, an embodiment of the present invention wherein the refrigerant is e.g. an HFC refrigerant and the lubricating oil is e.g. an alkylbenzene oil or a hardly compatible oil will be explained in reference to the accompanying drawings. In this embodiment, a lubricating oil which has the solubility by weight of 0.5–7% to the liquid refrigerant in the compressor is mainly considered. In FIG. 1 is shown the schematic diagram of the refrigerant circuit and the control circuit of the air conditioner with the refrigerating cycle apparatus according to the present invention incorporated thereinto. Although this embodiment is different from the first embodiment in detailed portions in that an HCFC refrigerant and a lubricating oil such as a numeral oil or a alkylbenzene oil, or an HFC refrigerant (R410A, R407C, R32 etc.) and ester or ether lubricating oil are used in the first embodiment, this embodiment is the same as the first embodiment in terms of basic circuit structure.

Now, the operation will be explained. In FIG. 2 is shown the schematic diagram of the flow of the refrigerant in the cooling operation, and in FIG. 3 is shown the schematic diagram of the flow of the refrigerant in the heating operation. Since the heating operation and the cooling operation in the refrigerating cycle apparatus according to this embodiment are the same as the first embodiment, explanation of the heating and cooling operations will be omitted. When a low outdoor air temperature causes the outdoor heat exchanger 5 to be cooled to a temperature below the ice point so as to form frost on the outdoor heat exchanger during the heating operation, the efficiency of the heat exchanger is extremely lowered. In this case, the outdoor microcomputer 13 determines based on a detected temperature from the frost detecting thermistor 10 whether the defrosting operation conditions are met or not. If affirmative, the defrosting operation starts to thaw the frost deposited on the outdoor heat exchanger 5.

In general, defrosting is carried out by switching the four-way valve 2 shown in FIG. 1 from the heating position to the cooling position as explained with respect to the prior art. By this switching, a gaseous refrigerant which is discharged and has a high pressure and a high quantity of heat is forwarded to the outdoor heat exchanger 5 to remove the frost on the outdoor heat exchanger 5 by the heat of the refrigerant. When defrosting is completed, the temperature of the pipe on the outlet side of the outdoor heat exchanger 5 is raised to a temperature not less than the ice point. The frost detecting thermistor detects it, and the outdoor microcomputer 13 determines based on the detection that the defrosting operation completion conditions are met, and carries out such a control to end the defrosting operation.

During the defrosting operation, the indoor fan 6 is normally stopped to prevent the room temperature from lowering. As a result, the refrigerant which has released heat in the outdoor heat exchanger 5 to be liquefied returns to the compressor 1 without being evaporated in the indoor heat exchanger 3. Although a part of the refrigerant is stored in the accumulator provided on the intake side of the compressor 1, a two-phase refrigerant of liquid and gas is normally inspired into the compressor 1. The compressor 1 is cooled by the refrigerant to have the temperature therein lowered.

In a combination of a refrigerant and a lubricating oil which are likely to be compatible such as a combination of an HCFC refrigerant (R22 etc.) and a lubricating oil of mineral oil such as an alkylbenzene oil, and a combination of an HFC refrigerant (R410A, R407C, R32 etc.) and an ester or ether lubricating oil, the lubricating oil has the refrigerant mixed thereinto, raising the oil level in the compressor 1. When the defrosting operation is completed and the normal heating operation restarts in such a state, a high speed of rotation of the compressor 1 causes the lubricating oil in the compressor 1 to be taken out of the compressor housing at a large amount.

On the other hand, the use of a hardly compatible oil with a combined use of an HFC refrigerant (R410A, R407C, R32 etc.) and an alkylbenzene oil as the lubricating oil creates a problem in that the lubricating oil is taken out of the compressor housing though a low compatibility between the refrigerant and the lubricating oil prevents the refrigerant with mixing into the lubricating oil. If the lubricating oil which has been taken out of the compressor housing is recovered into the compressor along with the refrigerant in the normal heating operation, the shortage of the oil hardly affects the reliability of the compressor since the operation with shortage of the lubricating oil is not so long. However, if the oil is not recovered in a short period of time, the reliability of the compressor is completely deteriorated.

The time required for recovery of the lubricating oil depends on the current speed of the refrigerant. The drop in a room temperature caused by a defrosting operation is normally as small as 1–2° C. When the defrosting operation ends and the heating operation restarts, the heating load in the room is small because of such a small difference between an actual room temperature and a set room temperature. The small heating load causes the indoor microcomputer 11 to command the outdoor microcomputer 13 to shift the operational frequency of the compressor 1 to a low speed range promptly after the completion of high speed restarting of the compressor. The heating operation is carried out in such a state that the lubricating oil which has been taken out of the compressor 1 on restarting is difficult to be recovered into the compressor.

In accordance with the present invention, the outdoor microcomputer 13 changes the minimum operational frequency of the compressor to a certain frequency higher than the normal minimum operational frequency in order that the lubricating oil which has been taken out of the compressor 1 can be promptly recovered into the compressor 1 when the defrosting operation tends and the heating operation restarts as shown in the timing chart of FIG. 4. Or, the minimum operational frequency is changed to a certain frequency higher than e.g. the minimum operational frequency before the defrosting operation.

In addition, in order to reduce the amount of the lubricating oil which is taken out of the compressor 1 on restarting of the compressor, the outdoor microcomputer 13 shifts the starting speed of the compressor 1 to the lower starting patterns a or b than the normal starting speed on restarting as shown in the graph of FIG. 6.

These control process are shown in the flow chart of FIG. 5. The process which correspond to FIG. 4 is made at S16, and the process which corresponds to FIG. 6 is made at S22.

Although explanation of the change in the minimum operational frequency of the compressor to a higher level and the reduction in the starting speed of the compressor during the heating operation after completion of the defrosting operation is made, the outdoor air temperature may be regarded as not being at the certain low temperature if the time wherein the defrosting operation has been carried out is not shorter than a certain period of time. In this case, the raise in the minimum operational frequency and the low speed starting of the compressor may not be carried out after the defrosting operation, or the change in the minimum operational frequency and the low speed starting may be released and the minimum operational frequency may be reset to a lower value than the raised minimum operational frequency.

13

EMBODIMENT 6

In FIG. 7 is shown the schematic diagram of the refrigerant circuit and the control circuit of the air conditioner with the refrigerating cycle apparatus according to the present invention incorporated thereinto. In FIG. 7, parts similar to corresponding to these in FIG. 1 are indicated by the same reference numerals, and explanation of these parts will be omitted. In FIG. 7, reference numeral 17 designates the compressor temperature thermistor as the temperature detector for the compressor 1. The outdoor microcomputer 13 includes means for altering a set value for the minimum operational frequency of the compressor 1 and means for altering the starting speed of the compressor 1, both of which make the alteration based on a detection signal from the defrosting condition detector and a temperature signal for the compressor 1 from the compressor temperature thermistor 17 prior to restarting. This embodiment uses a combination of an HFC refrigerant (R410A, R407C, R32 etc.) as the refrigerant and an alkylbenzene oil as the hardly compatible lubricating oil as in the fifth embodiment.

Now, the operation will be explained. When the outdoor air temperature is low during the heating operation, the outdoor heat exchanger is cooled to a temperature below the ice point to have frost formed thereon, extremely lowering the efficiency of the heat exchanger. In this case, the defrosting operation starts to thaw the frost deposited on the outdoor heat exchanger 5. The defrosting operation causes the compressor to be cooled by a liquid refrigerant so as to lower the temperature in the compressor as explained with respect to the fifth embodiment.

However, the amount of frost widely varies depending on not only an outdoor air temperature but also an outdoor air humidity. For this reason, the time required for the defrosting operation is affected by the outdoor air temperature and the outdoor air humidity.

When the amount of frost to be defrosted is small or the outdoor humidity is low, the drop in the compressor temperature during the defrosting operation is small since the time required for the defrosting operation is short. This means that the amount of the lubricating oil which is taken out of the compressor housing on restarting after completion of the defrosting operation is small. In this case, the minimum operational frequency of the compressor or the starting speed of the compressor on restarting may not be altered.

In accordance with the present invention, the detection signal from the compressor temperature thermistor 17 is also utilized in addition to the direction signal from the defrosting operation detector. When it is detected that the compressor temperature has lowered, the minimum operational frequency of the compressor is raised and the starting speed of the compressor 1 is reduced after completion of the defrosting operation. When it is not detected that the compressor temperature has lowered, the outdoor microcomputer 13 carries out such a control that the setting of the minimum operational frequency or the starting speed of the compressor is not altered.

As explained, based on signals from the compressor temperature detector detecting the temperature of the compressor in addition to the defrosting operation detector, the outdoor microcomputer 13 alters the minimum operational frequency and the starting speed if a large amount of lubricating oil has been taken out of the compressor housing. This embodiment can reduce the deterioration in comfort which would be otherwise caused by variations in room temperature adjustment due to a raise in the minimum operational frequency or a prolonged room temperature adjustment period of time due to a drop in the starting speed.

14

EMBODIMENT 7

In the fifth embodiment, if the defrosting operation has been carried out based on the temperature detection from the frost detecting thermistor 10, it is determined that the outdoor air temperature is at the certain low temperature, and the setting of the minimum operational frequency of the compressor 1 is altered. The frost detecting thermistor 10 of FIG. 1 may be utilized as a refrigerant temperature sensor for the outdoor heat exchanger 5 to detect the evaporation temperature of the refrigerant, and the outdoor microcomputer 13 may find the current speed of the refrigerant or the outdoor air temperature state based on the operational frequency of the compressor 1 to control the minimum operational frequency. This embodiment uses a combination of an HFC refrigerant (R410A, R407C, R32 etc.) as the refrigerant and an alkylbenzene oil as the hardly compatible lubricating oil as in the fifth embodiment.

Since the outdoor heat exchanger 5 as an evaporator absorbs outdoor air heat in the heating operation, the evaporation temperature lowers as the outdoor air temperature is colder, which is shown in FIG. 8. According to FIG. 8, the outdoor air temperature can be estimated based on an evaporation temperature and an operational frequency of the compressor. If the outdoor microcomputer 13 determines based on the detection temperature from the frost detecting thermistor 10 that the outdoor air temperature is at the certain low temperature, the minimum operational frequency is raised to a value at which the lubricating oil can be recovered to the compressor 1.

Or, the outdoor microcomputer 13 finds the current speed of the refrigerant based on the evaporation temperature of the refrigerant in the outdoor heat exchanger 5 and the operational frequency of the compressor 1 as shown in FIG. 9. If the outdoor microcomputer determines that a drop in the current speed due to a low outdoor air temperature is difficult to recover the lubricating oil into the compressor, a set minimum operational frequency for the compressor 1 may be raised to a value at which the lubricating oil can be recovered into the compressor.

Although the evaporation temperature is detected by the frost detecting thermistor 10 in this embodiment, the outdoor heat exchanger 5 may have a substantially intermediate portion provided with a required thermistor.

EMBODIMENT 8

Although an outdoor air temperature is found based on an evaporation temperature of the refrigerant in the outdoor heat exchanger 5 and an operational frequency of the compressor 1 in the fifth embodiment, the outdoor heat exchanger may be provided with an outdoor air temperature sensor 16 to directly detect an outer air temperature as shown in FIG. 10. In this case, if the outdoor microcomputer 13 determines based on a detection signal from the outdoor air temperature sensor 16 that the outdoor air is at the certain low temperature, a set minimum operational frequency of the compressor 1 is raised or the starting speed of the compressor 1 is reduced.

This embodiment uses a combination of an HFC refrigerant (R410A, R407C, R32 etc.) as the refrigerant and an alkylbenzene oil as the hardly compatible lubricating oil as in the fifth embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A refrigerating cycle apparatus which is constituted by connecting an inverter driven compressor with controllable speed of rotation, a four-way valve, an indoor heat exchanger, a pressure reducing device and an outdoor heat exchanger by refrigerant pipes, comprising:

a defrosting condition detector for detecting a frosting state of the outdoor heat exchanger during a heating operation;

a defrosting operation controller for carrying out a defrosting operation based on a detection signal from the defrosting condition detector; and at least one of a minimum operable frequency controller for controlling a minimum operable frequency for the compressor on completion of the defrosting operation and a starting speed controller for controlling a starting speed for the compressor based on a detection signal from the defrosting condition detector on completion of the defrosting operation.

2. The refrigerating cycle apparatus according to claim 1, further comprising a compressor temperature detector for detecting a temperature of the compressor; wherein the minimum operable frequency controller controls the minimum operable frequency based on a detection signal from the defrosting condition detector and a detection signal from the compressor temperature detector.

3. The refrigerating cycle apparatus according to claim 1, further comprising a refrigerant temperature sensor provided on the outdoor heat exchanger; wherein the minimum operable frequency controller controls the minimum operable frequency based on a detection signal from the refrigerant temperature sensor and an operational frequency of the compressor.

4. The refrigerating cycle apparatus according to claim 1, further comprising an outdoor air temperature sensor for detecting an outdoor air temperature; wherein the minimum operable frequency controller controls the minimum operable frequency based on a detection signal from the outdoor air temperature sensor.

5. The refrigerating cycle apparatus according to claim 1, further comprising a compressor temperature detector for detecting a temperature of the compressor; wherein the starting speed controlling means controls the minimum operable frequency based a detection signal from the defrosting condition detector and a detection signal from the compressor temperature detector.

6. The refrigerating cycle apparatus according to claim 1, further comprising an outdoor air temperature sensor; wherein the starting speed controller controls the starting speed based on a detection signal form the outdoor air temperature sensor.

7. The refrigerating cycle apparatus according to claim 1, wherein a lubricating oil is retained in a housing of the compressor and lubricates sliding parts of the compressor, wherein when the oil is flowed out into a refrigerating cycle from the compressor, the oil circulates in the refrigerating cycle along with a refrigerant, and wherein the oil is hardly compatible with the refrigerant and the oil has such a fluidity and a viscosity that the oil can return to compressor.

8. The refrigerating cycle apparatus according to claim 7, wherein the refrigerant is an HFC refrigerant and the lubricating oil is an alkylbenzene lubricating oil.

9. The refrigerating cycle apparatus according to claim 8, wherein the refrigerant is selected from the group of an R410A refrigerant, an R407C refrigerant and an R32 refrigerant.

10. The refrigerating cycle apparatus according to claim 2, wherein a lubricating oil is retained in a housing of the compressor and lubricates sliding parts of the compressor, wherein when the oil is flowed out into a refrigerating cycle from the compressor, the oil circulates in the refrigerating cycle along with a refrigerant, and wherein the oil is hardly compatible with the refrigerant and the oil has such a fluidity and a viscosity that the oil can return to compressor.

11. The refrigerating cycle apparatus according to claim 3, wherein a lubricating oil is retained in a housing of the compressor and lubricates sliding parts of the compressor, wherein when the oil is flowed out into a refrigerating cycle from the compressor, the oil circulates in the refrigerating cycle along with a refrigerant, and wherein the oil is hardly compatible with the refrigerant and the oil has such a fluidity and a viscosity that the oil can return to compressor.

12. The refrigerating cycle apparatus according to claim 4, wherein a lubricating oil is retained in a housing of the compressor and lubricates sliding parts of the compressor, wherein when the oil is flowed out into a refrigerating cycle from the compressor, the oil circulates in the refrigerating cycle along with a refrigerant, and wherein the oil is hardly compatible with the refrigerant and the oil has such a fluidity and a viscosity that the oil can return to compressor.

13. The refrigerating cycle apparatus according to claim 5, wherein a lubricating oil is retained in a housing of the compressor and lubricates sliding parts of the compressor, wherein when the oil is flowed out into a refrigerating cycle from the compressor, the oil circulates in the refrigerating cycle along with a refrigerant, and wherein the oil is hardly compatible with the refrigerant and the oil has such a fluidity and a viscosity that the oil can return to compressor.

14. The refrigerating cycle apparatus according to claim 6, wherein a lubricating oil is retained in a housing of the compressor and lubricates sliding parts of the compressor, wherein when the oil is flowed out into a refrigerating cycle from the compressor, the oil circulates in the refrigerating cycle along with a refrigerant, and wherein the oil is hardly compatible with the refrigerant and the oil has such a fluidity and a viscosity that the oil can return to compressor.

* * * * *